United States Patent [19]

Horton

[11] 4,067,592
[45] Jan. 10, 1978

[54] ANTI-JACKNIFE APPARATUS

[76] Inventor: Rodney Horton, 246 Essex St., Beverly, Mass. 01915

[21] Appl. No.: 679,205

[22] Filed: Apr. 22, 1976

[51] Int. Cl.² .............................................. B62D 53/06
[52] U.S. Cl. ..................................................... 280/432
[58] Field of Search ................ 280/432, 446 B, 446 R

[56] References Cited

U.S. PATENT DOCUMENTS

| 2,528,076 | 10/1950 | Plaxco | 280/432 |
| 2,959,429 | 11/1960 | Lavelle | 280/432 |
| 3,136,566 | 6/1964 | Harding | 280/432 X |
| 3,751,070 | 8/1973 | Schaffart | 280/432 |

FOREIGN PATENT DOCUMENTS

| 487,406 | 12/1953 | Italy | 280/446 R |

*Primary Examiner*—Joseph F. Peters, Jr.
*Assistant Examiner*—John A. Pekar
*Attorney, Agent, or Firm*—Wolf, Greenfield & Sacks

[57] ABSTRACT

A device that tends to retard or impede the articulating movement between a truck tractor and its associated trailer to thereby reduce the likelihood of the vehicle jacknifing which is especially possible when there are wet or icy road conditions. The tractor and trailer are intercoupled by a conventional fifth wheel assembly comprised of upper and lower fifth wheel plates. The movement impeding device is preferably mounted from the tractor and is pneumatically operated. The device comprises a piston having a resilient end, means for supporting the piston for movement normal to the upper fifth wheel plate, and means for operating the piston so that the resilient end is selectively engaged with the lower surface of the upper fifth wheel plate thereby retarding relative rotation between the trailer and tractor.

14 Claims, 6 Drawing Figures

ANTI-JACKNIFE APPARATUS

BACKGROUND OF THE INVENTION

The present invention relates to a device that is used in association with a tractor-trailer vehicle for preventing jacknifing of these types of articulating vehicles.

"Jacknifing" is the undesired swinging of either the tractor or trailer to one side or to the other of the proper line of motion that should exist between the portions of the vehicle. It is most likely to occur when the trailer is of the semi-trailer type, having rear wheels only, and supported at the front by a lower fifth wheel plate on the tractor. This condition is more apt to occur when there are wet or icy conditions on the road wherein either the tractor or trailer tends to skid.

Devices do exist for preventing or restricting the undesired turning or swinging movement of one part of the vehicle relative to the other part. See for example U.S. Pat. Nos. 2,468,705; 3,667,778; and 3,231,295. The U.S. Pat. to Price No. 2,468,705, for example, shows in FIG. 4 a C-clamp arrangement. With this arrangement it is difficult to position the mechanism and a special fifth wheel structure is necessary which extends forwardly of the trailer. Also, with this arrangement there is a disadvantage in that the fifth wheel assembly must extend a substantial direction transversely of the vehicle to provide this clamping action at many different relative angles between the trailer and tractor. In another embodiment of the Price invention the fifth wheel assembly is provided with apertures for receiving a plunger. This arrangement is not satisfactory as it appears that the upper and lower fifth wheels must be in a particular predetermined position before the retarding force can be applied by the plunger. Furthermore, with this prior art arrangement there would appear to be an excessive amount of wear on the components that are used.

Other prior art structures are unsatisfactory for a number of other reasons. For example, some of these structures are unduly complex and all of the structures appear to require a redesign of the fifth wheel assembly.

Accordingly, one object of the present invention is to provide an improved device for preventing jacknifing of a vehicle by retarding or resisting movement between the upper and lower fifth wheel plates of the fifth wheel assembly. Another object of the present invention is to provide a device in accordance with the preceding object wherein the fifth wheel assembly is essentially unaltered in order to accommodate the device of this invention.

Still a further object of the present invention is to provide a retarding or resisting device for use with a tractor-trailer vehicle and comprising a piston having a resilient end for directly contacting the lower surface of the upper fifth wheel plate.

Another object of the present invention is to provide an adaptor plate for use with some fifth wheel assemblies for providing a bearing surface against which the piston contacts. This adaptor plate is usually necessary on some types of trucking equipment such as gravel trucks or oil tank trucks.

Still a further object of the present invention is to provide an anti-jacknifing apparatus for use in association with a fifth wheel assembly of a vehicle and which apparatus is relatively simple to install in an existing vehicle, can be manufactured relatively inexpensively, and is easy to maintain.

SUMMARY OF THE INVENTION

To accomplish the foregoing and other objects of this invention there is provided an anti-jacknifing apparatus for use in association with a fifth wheel assembly of a tractor-trailer vehicle. This apparatus comprises a piston having a resilient upper end means, column support means for the piston, means for securing the column support means to a frame of the tractor, and actuating means for moving the piston into and out of engagement with the exposed lower surface of the upper fifth wheel plate. The piston is not of the usual cylindrical shape in the preferred embodiment but comprises a pair of spaced connecting rods having a support bar extending therebetween. A resilient pad may be secured to the top of a support bar and the support bar may be of rectangular shape. The resilient pad may be constructed of a hard rubber material. The column support means may comprise a pair of spaced columns which respectively receive the connecting rods of the piston. These spaced support columns may be suitably secured to parallel frame members of the tractor. The actuating means is preferably pneumatically operated and includes a linkage assembly which couples to the bottom of each of the connecting rods for urging the piston toward and away from the fifth wheel assembly. The bottom of each of the connecting rods may have adjustable means for receiving the linkage assembly. The device of this invention is preferably operated from the cab of the vehicle by simply throwing a switch to an operative position for activating the device so that the resilient end of the piston contacts the upper fifth wheel plate.

BRIEF DESCRIPTION OF THE DRAWINGS

Numerous other objects, features and advantages of the invention will now become apparent upon a following detailed description taken in conjunction with the accompanying drawings, in which.

DETAILED DESCRIPTION

Figure 1:
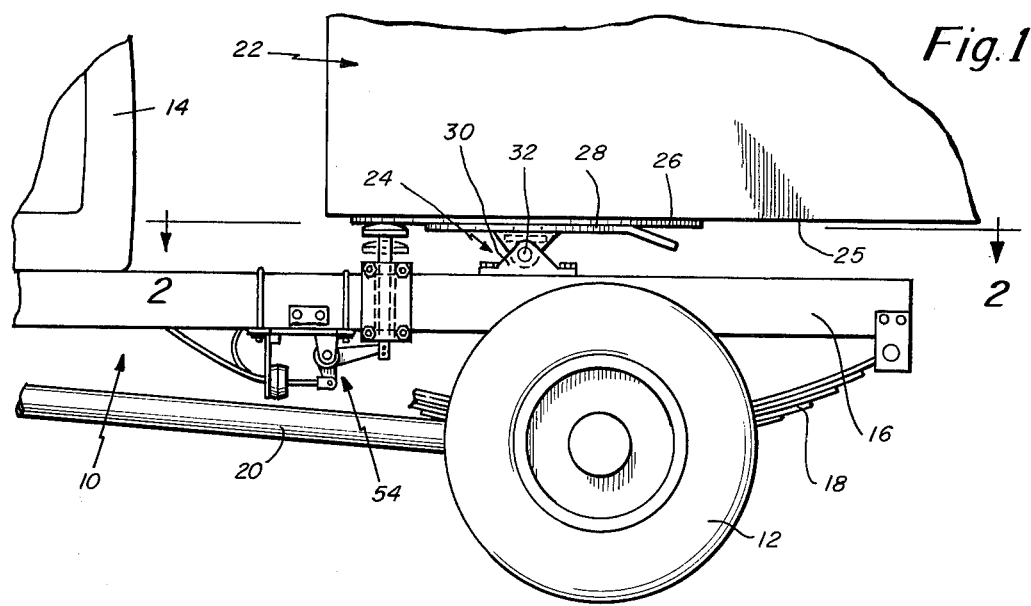
FIG. 1 is a side elevational view of a tractor-trailer vehicle having the device of this invention secured thereto.

Referring now to the drawings, and in particular to FIG. 1 there is shown a vehicle which comprises a tractor 10 having rear wheels 12, a cab 14, and a pair of frame members 16. FIG. 1 shows the frame member 16 being supported at least partially by a conventional leaf spring 18 which is secured in a conventional manner to the axle 19 extending between the wheel hubs 12. The wheels 12 are driven by a motor of the vehicle by way of the drive shaft 20. The fragmentary part of the trailer 22 is shown as carrying a portion of the fifth wheel assembly 24. The bottom surface 25 of the trailer has secured thereto the upper fifth wheel plate 26, which may be secured in any well known manner such as by bolting, welding or riveting.

The fifth wheel assembly 24 also comprises a lower fifth wheel plate which is fixedly secured to a support bracket 30 so that the plate 28 can pivot about point 32. Because the fifth wheel assembly shown in the drawings is conventional all of the details have not been shown. For example, there may be spring means associated with this assembly for normally tilting the lower plate 28. When the tractor is driven under the trailer the plate 28 then tilts and the assembly is secured together, for example, by means of a conventional pin 34 which extends through both of the plates 26 and 28 but permits relative rotation between these plates which is necessary, of course, for any circumstances where the tractor and trailer are to be out of line relative to each other.

Figure 3:
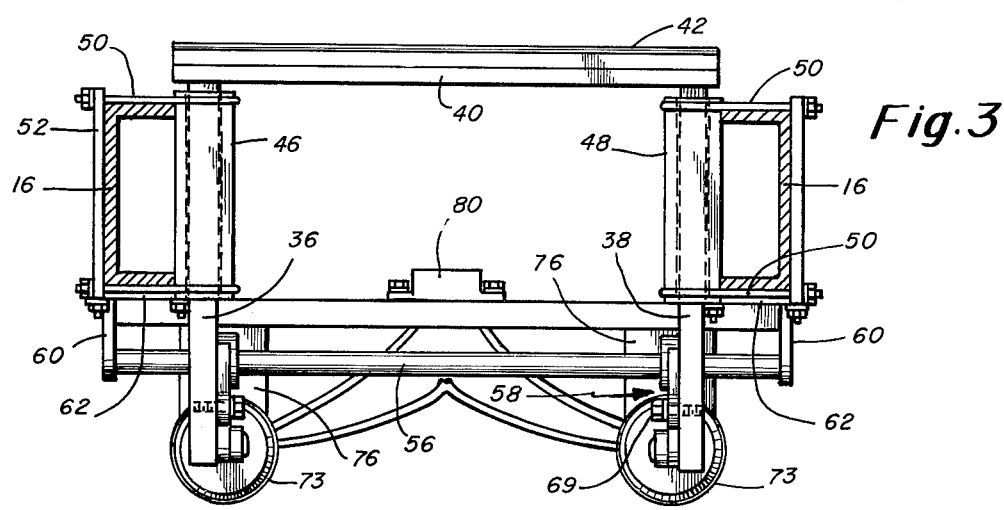
FIG. 3 is a cross sectional view taken along line 3—3 of FIG. 2.
Figure 4:
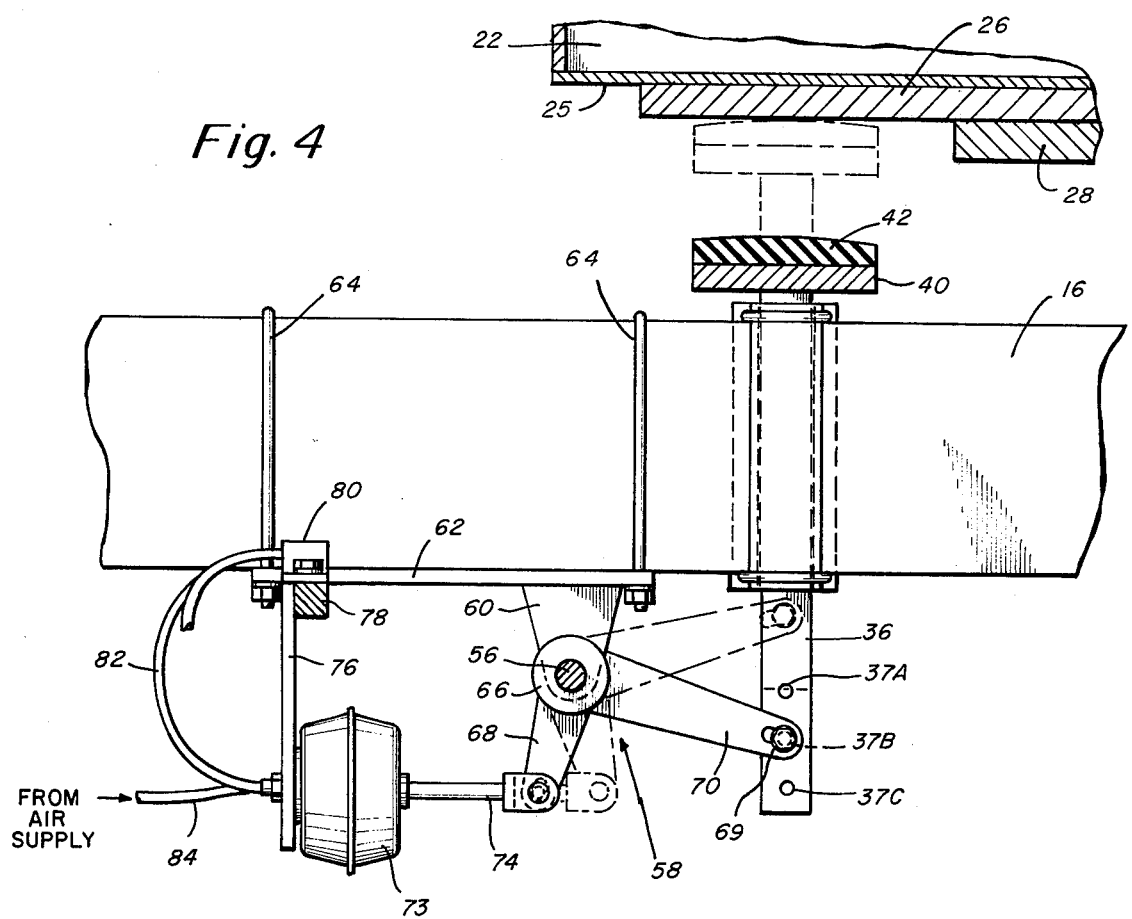
FIG. 4 is an enlarged side view partially in cross section and as depicted in FIG. 1.

In the disclosed embodiment, the device of this invention is basically supported from the frame members 16, each of which has a U-shaped cross section as indicated in FIG. 3. The device of this invention may be termed a form of a piston and comprises connecting rods 36 and 38 fixed together at their top ends by means of a rectangular support plate 40 for supporting the rectangular resilient pad 42. The connecting rods 36 and 38 are respectively supported in the hollow columns 46 and 48 as shown in FIG. 3. Each of the columns is held against the frame member 16 by means of U-bolts 50 which pass through a support plate 52 at their free end. Two nuts are associated with each U-bolt for securing the U-bolt to the plate 52. The bottom end of each of the connecting rods 36 and 38, as depicted in FIG. 4, have three spaced apertures 37A, 37B, and 37C. These apertures are spaced to provide an adjustment for a height difference between the tractor and trailer. These apertures may be spaced by 3 inches from each other.

The connecting rods are actuated by a link assembly 54 which comprises a support rod 56, a pair of link members 58, and end rod support bars 60. The linkage assembly 54 is supported from a pair of support plates 62 held along the bottom surface of each of the frame members 16 by means of a pair of bolts 64 having nuts associated therewith for securing the plates 62 in position. The support flanges 60 are secured to the plates 62 in a well known manner such as by welding thereto. The ends of the support rod 56 may also be fixedly secured in the support flanges 60.

The link members 58 each comprise a journal 66 having a passage therethrough for receiving the rod 56, and arms 68 and 70. The member 58 is shown most clearly in FIG. 4. The arm 70 secures to one of the apertures of the connecting rod by means of a pin arrangement 69. This pin may be a headed pin with a cotter pin associated therewith or it may be a bolt having washers associated therewith. The linkage member 58 is free to pivot about the support rod 56. FIG. 4 shows the linkage member in solid holding the connecting rods in their lower position or the unactuated position of the piston assembly. FIG. 4 shows in dotted the actuated position of the device. If the distance between the tractor and trailer is greater than that shown in FIG. 4 then the pin 69 may be removed and engaged with the hole 37C. In that way the piston assembly can be actuated to lift higher and engage the upper fifth wheel plate 26.

The arm 68 is actuated from a diaphragm 73; there actually being two diaphragms 73 as shown in FIG. 3 for actuating each of the link members 58. In FIG. 4 the diaphragm is shown in its relaxed position with the rod 74 urged inwardly of the diaphragm so as to hold the device in the position shown in solid in FIG. 4. Each of the diaphragms 73 is supported from a support plate 76 which is in turn secured to a cross member 78 and the support plate 62. The cross member 78 is for supporting an air release valve 80. Air conductor lines 82 couple between the air release valve 80 and each of the diaphragms 73. A further air actuating line 84 branches to each of the diaphragms 73 as indicated in FIG. 2.

The air supply line 84 may couple to a pressurized supply of air preferably by way of an electrically operated air valve that may be operated by an electrical switch in the driver's compartment. When this switch is closed to its activated state then air is coupled from the air supply via the line 84 to each of the diaphragms 73 for causing operation thereof. When the diaphragms are operated the operating rod 74 associated therewith moves outwardly from the diaphragm causing the link members 58 to rotate which in turn lifts both of the connecting rods 36 and 38. This action urges the resilient pad 42 into contact with the plate 26 as shown in dot, in FIG. 4. FIG. 1 shows, in solid, the actuated position of the device of this invention.

Figure 5:
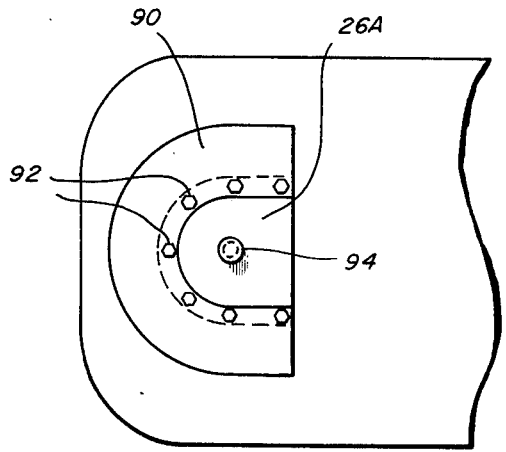
FIG. 5 is a bottom view of the trailer in the fifth wheel area showing an adaptor in accordance with this invention.
Figure 6:
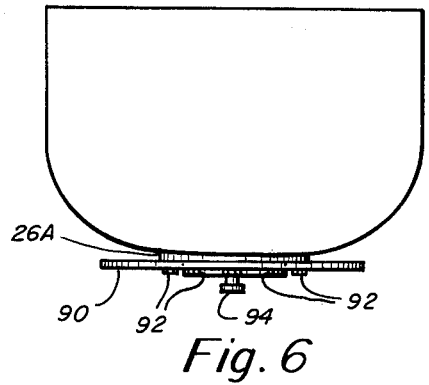
FIG. 6 is a side elevational view of the adaptor shown in FIG. 5.

In some trucks the upper portion of the fifth wheel assembly is rather small in area. This is due primarily to the configuration of the trailer which may have a curved bottom as is found in a gravel truck or oil tank truck. FIGS. 5 and 6 show an adaptor plate 90 which may be mounted by bolts 92 to the rather small upper fifth wheel plate 26A. FIG. 6 also shows a pin 94 which is a conventional arrangement for securing the upper and lower portions of the fifth wheel assembly.

Figure 2:
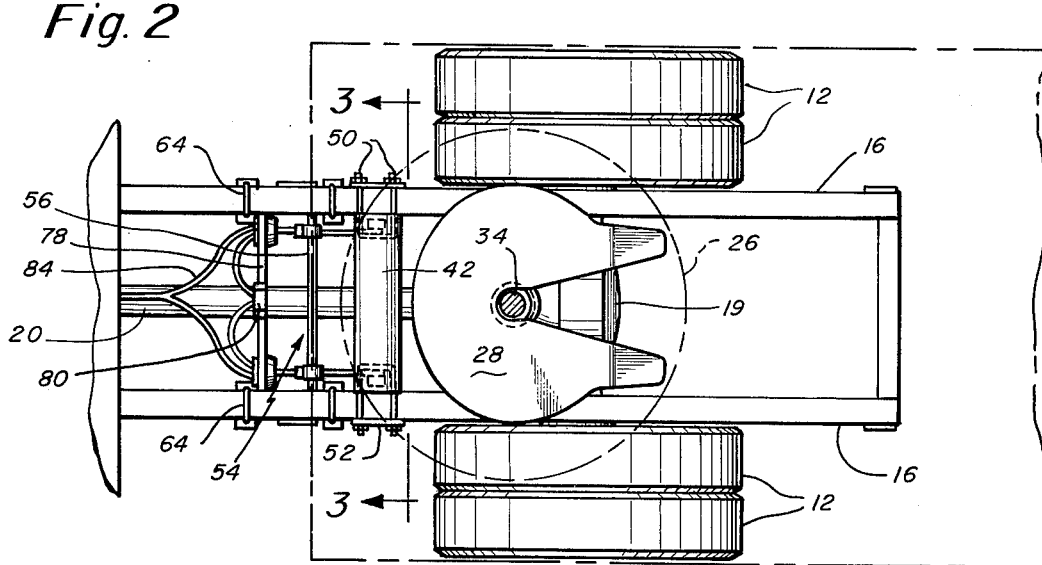
FIG. 2 is a cross sectional view taken along line 2—2 of FIG. 1 between the upper and lower plates of the fifth wheel assembly.

It is noted in FIG. 2 that the pad 42 is somewhat elongated in shape and if the tractor and trailer are twisted with respect to each other then the pad 42 tends to follow the curvature of the upper fifth wheel plate 26. With the adaptor 90 shown in FIGS. 5 and 6 the pad 42 functions similarly and is urged against this adaptor plate 90 rather than against the fifth wheel plate itself.

Having described a limited number of embodiments of this invention, it should now become apparent to those skilled in the art that numerous other modifications can be made in these embodiments all of which are contemplated as falling within the scope of this invention. The device can be mounted essentially on the other side of wheel 12 for engagement with the rear end of the upper fifth wheel plate. The diaphragm 73 is preferably continuously operated from the air supply 84 as long as the switch is in its actuated position but in an alternative embodiment the diaphragm may connect to an intermittent regulator for providing pulsating of the output from the diaphragm.

What is claimed is:

1. An anti-jacknifing apparatus for use in association with a fifth wheel assembly of a tractor-trailer vehicle comprising;
   contact means including rigid support means and resilient pad means mounted over the rigid support means,
   said trailer having plate means with its lower surface positioned for contact by the contact means,
   said fifth wheel assembly including a lower fifth wheel on the tractor,
   means for supporting the contact means from the tractor with the rigid support means of the contact means being moveable in a generally vertical direction, and the resilient pad means being disposed outside of the outer periphery of the lower fifth wheel, and means coupled to the rigid support means of the contact means for actuating the contact means to move the resilient pad means of the contact means to engage the plate means for restricting relative swinging motion between the tractor and trailer.

2. An anti-jacknifing apparatus as set forth in claim 1 wherein said resilient pad means extends about a peripheral segment of said plate means.

3. An anti-jacknifing apparatus as set forth in claim 2 wherein said resilient pad means has an elongated shape, said rigid support means also including means having an elongated shape coterminous with the shape of the pad means.

4. An anti-jacknifing apparatus as set forth in claim 1 wherein said plate means extends outwardly over the lower fifth wheel having a segmented annular contacting surface extending beyond the lower fifth wheel.

5. An anti-jacknifing apparatus as set forth in claim 4 wherein said resilient pad means has an elongated shape for selective contact with the contacting surface of the plate means.

6. An anti-jacknifing apparatus for use in association with a fifth wheel assembly of a tractor-trailer vehicle comprising;

contact means including rigid support means and pad means mounted over the rigid support means, said trailer having plate means with a lower surface positioned for contact by the contact means, said fifth wheel assembly including a lower fifth wheel on the tractor, means for supporting the contact means from the tractor with the rigid support means of the contact means being moveable in a generally vertical direction toward and away from the plate means, said pad means being disposed outside of the outer periphery of the lower fifth wheel, and means coupled to the contact means for actuating the contact means to move it to engage the plate means for restricting relative swinging motion between the tractor and trailer.

7. An anti-jacknifing apparatus as set forth in claim 6 wherein said pad means includes a resilient upper end means for contacting the plate means.

8. An anti-jacknifing apparatus as set forth in claim 7 wherein said contacting means includes a pair of connecting rods interconnected at their top end by a support bar for holding the resilient upper end means, both said support bar and resilient upper end means having a rectangular shape.

9. An anti-jacknifing apparatus as set forth in claim 7 wherein said contacting means includes a pair of connecting rods interconnected at their top end by a support bar for holding the resilient upper end means, each of said connecting rods having an adjustable lower end for adjusting the dwell position of the contacting means relative to the trailer.

10. An anti-jacknifing apparatus as set forth in claim 9 wherein said means for actuating comprises a pair of lever members each having one end arm coupled to the lower end of of a connecting rod.

11. An anti-jacknifing apparatus as set forth in claim 10 including an air actuated diaphragm having an output shaft coupled to another arm of the lever members and common support means for the diaphragm and lever members.

12. An anti-jacknifing apparatus as set forth in claim 7 wherein said contacting means includes a pair of spaced connecting rods interconnected at their top end by a support bar for holding the resilient upper end means, said supporting means for the contacting means including hollow support columns, one for holding each connecting rod and means for securing each hollow support column to a front-to-rear extending frame member of the tractor.

13. An anti-jacknifing apparatus as set forth in claim 6 wherein said pad means is resilient and said moveable means comprises a pair of spaced connecting rods interconnected at their top ends by a support bar for the resilient pad means.

14. An anti-jacknifing apparatus as set forth in claim 6 wherein said contacting means is supported independently of the lower fifth wheel with a complete absence of penetration of the contact means through any part of the lower fifth wheel.

* * * * *